US008700270B2

(12) United States Patent
Foster et al.

(10) Patent No.: US 8,700,270 B2
(45) Date of Patent: Apr. 15, 2014

(54) SYSTEM AND METHOD FOR DETERMINING DRAWBAR FORCE MAGNITUDE AND DIRECTION

(75) Inventors: Christopher A. Foster, Denver, PA (US); Kevin M. Smith, Narvon, PA (US)

(73) Assignee: CNH America LLC, New Holland, PA (US)

( * ) Notice: Subject to any disclaimer, the term of this patent is extended or adjusted under 35 U.S.C. 154(b) by 10 days.

(21) Appl. No.: 13/179,840

(22) Filed: Jul. 11, 2011

(65) Prior Publication Data

US 2013/0018552 A1    Jan. 17, 2013

(51) Int. Cl.
*G06F 7/70* (2006.01)

(52) U.S. Cl.
USPC .................................. 701/50; 172/7

(58) Field of Classification Search
USPC .......................................................... 701/50
See application file for complete search history.

(56) References Cited

U.S. PATENT DOCUMENTS

| | | | |
|---|---|---|---|
| 3,695,096 A | 10/1972 | Kutsay | |
| 4,425,970 A | 1/1984 | Dwyer et al. | |
| 4,427,075 A | 1/1984 | Romes | |
| 4,628,583 A | 12/1986 | Barnett | |
| 4,807,136 A | 2/1989 | Rutkowski et al. | |
| 4,838,173 A * | 6/1989 | Schroeder et al. | 105/35 |
| 5,060,965 A | 10/1991 | Haefner et al. | |
| 5,441,293 A | 8/1995 | Sturgess | |
| 6,053,521 A * | 4/2000 | Schertler | 280/511 |
| 6,196,327 B1 | 3/2001 | Patel et al. | |
| 6,497,153 B1 | 12/2002 | Hoskinson et al. | |
| 6,739,611 B2 | 5/2004 | Gisinger et al. | |
| 2002/0175486 A1 | 11/2002 | Young et al. | |
| 2007/0131438 A1* | 6/2007 | Brandt et al. | 172/464 |
| 2008/0053669 A1 | 3/2008 | Hou et al. | |
| 2008/0066934 A1* | 3/2008 | Hou | 172/7 |
| 2008/0257569 A1 | 10/2008 | Foster et al. | |
| 2008/0257570 A1 | 10/2008 | Keplinger et al. | |
| 2008/0267719 A1 | 10/2008 | Corcoran | |
| 2009/0032273 A1* | 2/2009 | Hahn | 172/2 |

FOREIGN PATENT DOCUMENTS

| | | | |
|---|---|---|---|
| JP | 63-96530 A | 4/1988 | |
| JP | 2004-45219 A | 2/2004 | |

\* cited by examiner

*Primary Examiner* — John Q Nguyen
*Assistant Examiner* — Jordan S Fei
(74) *Attorney, Agent, or Firm* — Patrick M. Sheldrake

(57) ABSTRACT

A system and method is provided for determining the magnitude and direction of the draft force applied to the drawbar of a tractor by a towed implement. Orthogonal load sensors can be placed at the drawbar pivot point to measure load on the drawbar. From the measured load on the drawbar, the lateral and longitudinal draft forces applied by the towed implement on the drawbar can be calculated. The magnitude and direction of the draft force can then be determined from the calculated lateral and longitudinal forces.

20 Claims, 5 Drawing Sheets

SYSTEM AND METHOD FOR DETERMINING DRAWBAR FORCE MAGNITUDE AND DIRECTION

BACKGROUND

The present application relates generally to a system and method for measuring drawbar force. The present application relates more specifically to the determining or calculating of the magnitude and direction of forces on the drawbar for use with an electronic draft control system.

One of the most common uses of agricultural tractors is to move implements through agricultural fields to cultivate and condition the soil. Implements are commonly connected for towing by the tractor using a three-point hitch or a drawbar. A three-point hitch typically has two bottom lift arms, to which the implement is connected in a rotary manner to selectively pivot about a given hinge axis, and a top link interposed between the tractor frame and the implement to control the angular position of the implement about the hinge axis. The lift arms are moved by actuating a cylinder (or cylinders) interposed between the tractor frame and the lift arms to raise and lower the implement with respect to the ground. Similarly, many trailed implements towed using a drawbar include one or more wheels pivotably connected to the implement in a manner to raise and lower the implement with respect to the ground. Movement of the lift arms and/or implement-attached wheels can be used to establish implement position with respect to the ground.

In today's farming practices, control of the quality of cultivation performed by various ground-engaging devices attached to the frame of the implement can be desirable and sometimes critical. As the implement frame is lowered closer to the ground, the ground-engaging devices or tools dig or cut deeper into the soil and the draft load on the tractor increases. As the frame is raised higher above the ground, the ground-engaging devices dig more shallowly into the soil and the draft load on the tractor decreases. Some implements must remain engaged with the ground during operation such that the tools do not become disengaged from the ground, which is usually implemented by specifying a minimum ground engagement depth. Typically, the operator has a manually operable device in the cab of the tractor that is manipulated to raise and lower the implement accordingly, whether by the three-point hitch, the implement wheels, or a combination of the two. When the operator finishes manipulating the device, the implement remains in the position set by the operator, but will not, however, maintain a desired depth of engagement or implement draft load as the tractor and implement move across the ground. Changes in field contour or soil hardness cause the depth of engagement and/or the draft load to change.

To maintain the implement in a position to achieve a consistent draft load or depth of engagement, the operator must periodically look rearward and observe the implement. If the implement has drifted away from the desired depth of engagement, the operator must manipulate the depth control device to reposition the implement until the desired depth of engagement is reestablished. Similarly, changes that increase the draft load may cause the engine to be bogged down, requiring operator adjustment of implement position to avoid stalling the engine. Therefore, for systems in which the operator can adjust the implement position, periodic or semi-constant (under some field conditions) visual monitoring of the implement position and adjustment of the hitch height is necessary to maintain the desired draft load on the tractor.

The concept of electronic draft control (EDC) systems has been applied to alleviate the need for manual operator hitch adjustments by controlling the position of the connected implement in response to the draft loads applied to the tractor by the implement. EDC systems permit the depth of engagement to be adjusted so that a constant draft load is applied to the tractor to smooth tractor operation. Such control systems typically rely on one or more measuring devices to sense the draft load applied to the hitch by the implement and the implement position, and then adjust the implement position in response. Numerous methods have been used to monitor the draft load on a tractor including: direct measure using a special draft pin fitted in the drawbar, i.e., a load bearing pin that can electrically measure the strain on the pin from a given load; monitoring the hydraulic pressure in hydraulically cushioned drawbars; monitoring the cushion deflection in spring or elastic material cushioned drawbars; and derivation of the draft load from engine and/or wheel torques.

All of the previously mentioned methods for monitoring draft load can be effective so long as the connected implement is essentially coaxial with the tractor since the previous methods measure only the longitudinal draft load force, i.e., the previous methods measure the draft load force along the "common axis." However, when using a drawbar connection, the tractor and connected implement may not be coaxial, such as when travelling along a curved path, and lateral draft forces can be introduced, i.e., draft forces that are perpendicular to the longitudinal draft forces. The presence of lateral draft forces can lower the longitudinal draft forces typically sensed by the EDC systems and, as a result, the EDC will make control decisions, e.g., raising or lowering of the implement, based on an inaccurate measurement of the draft load, since the EDC system is not provided with, nor factoring in, the lateral component of the draft load. Stated differently, the sensors used in a drawbar hitch EDC system measure force along a specific axis/direction. Only the magnitude of the force along the specific axis/direction is measured and provided to the EDC system. If a force is acting at an angle to the specified measurement axis/direction of the sensor, this force is not measured and only the force component acting along the specified axis is measured.

Therefore, what is needed is a system and method to determine both the magnitude and direction of the draft forces on a tractor with a drawbar connected implement.

SUMMARY

The present application relates to a method including measuring a first force and a second force on a drawbar of a tractor. The first force and the second force on the drawbar are generated by a towed implement. The method also includes calculating a lateral component of a draft force applied to the tractor by the towed implement using the first measured force and the second measured force and calculating a longitudinal component of the draft force applied to the tractor by the towed implement using the first measured force and the second measured force. The method further includes calculating a magnitude of the draft force applied to the tractor by the towed implement using the calculated longitudinal component of the draft force and the calculated lateral component of the draft force and calculating a direction of the draft force applied to the tractor by the towed implement using the calculated longitudinal component and the calculated lateral component. The direction of the draft force is calculated relative to the center axis of the drawbar. The method additionally includes providing the calculated magnitude of the draft force and the calculated direction of the draft force to an electronic draft control system and setting an operating configuration of at least one of the tractor or towed implement with the electronic draft control system in response to at least one of the calculated magnitude of the draft force or the calculated direction of the draft force.

The present application also relates to an electronic draft control system for a tractor having a drawbar. The control system includes a first sensor to measure a first force on a drawbar of a tractor generated by a towed implement and a second sensor to measure a second force on the drawbar of a tractor generated by a towed implement. A first controller includes a microprocessor to execute a computer program to calculate the magnitude and direction of the draft force applied to the tractor using the first measured force and the second measured force. A second controller includes a microprocessor to execute a computer program to generate a control signal to establish an operating configuration of at least one of the tractor or towed implement in response to at least one of the calculated magnitude or direction of the draft force. The first and second controllers can be incorporated into a single controller or they can be individual controllers.

One advantage of the present application is the ability to measure both the magnitude and direction of the drawbar force in the horizontal plane for electronic draft control.

Another advantage of the present application is the ability to measure both the longitudinal draft force and the lateral draft force applied by an implement connected to a tractor.

Other features and advantages of the present application will be apparent from the following more detailed description of the exemplary embodiments, taken in conjunction with the accompanying drawings.

BRIEF DESCRIPTION OF THE FIGURES

Wherever possible, the same reference numbers will be used throughout the drawings to refer to the same or like parts.

DETAILED DESCRIPTION OF THE EXEMPLARY EMBODIMENTS

Figure 1:
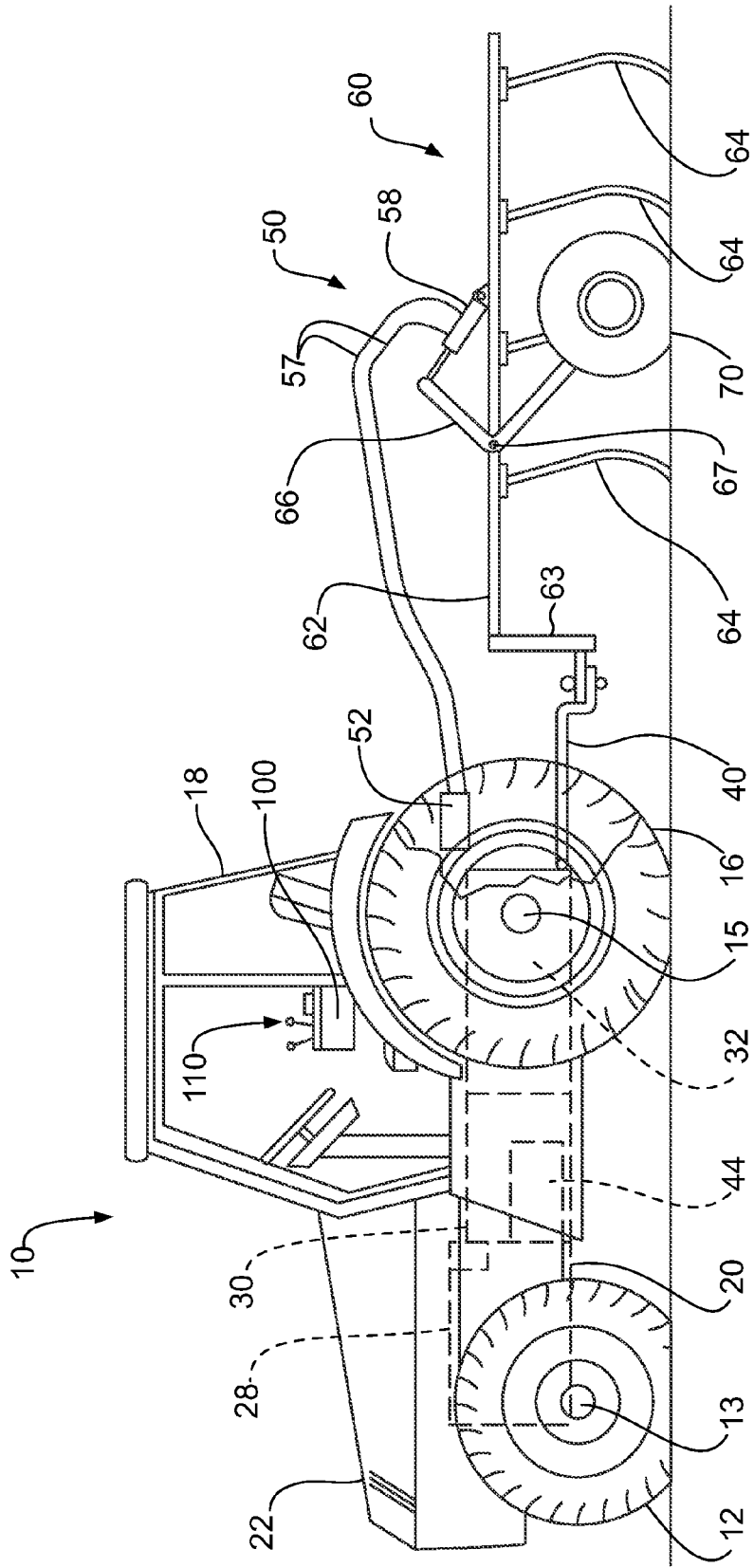
FIG. 1 shows a side view of an embodiment of an agricultural tractor towing a ground-engaging implement by a drawbar.
Figure 2:
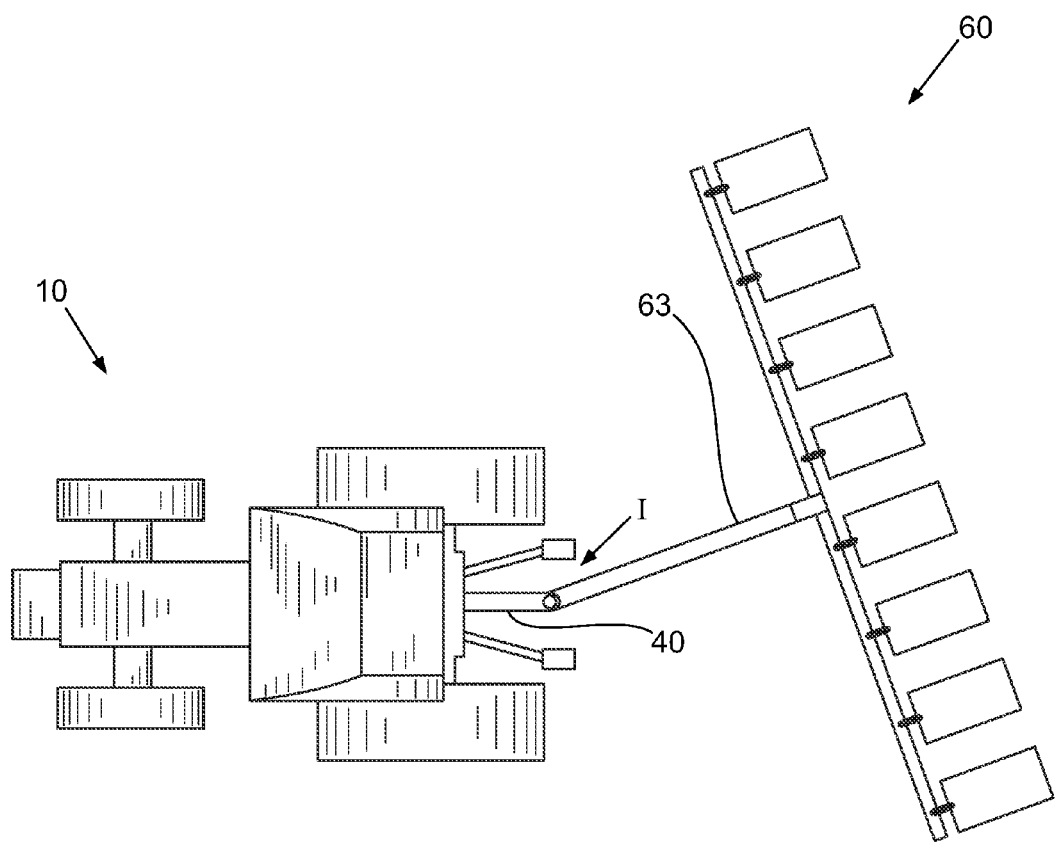
FIG. 2 shows a top view of an embodiment of an agricultural tractor towing an implement at an angle to the agricultural tractor.

FIGS. 1 and 2 show an agricultural tractor and towed or trailed implement. An agricultural tractor 10 can have a pair of front wheels 12 connected to opposing ends of a front axle 13, a pair of rear wheels 16 connected to opposing ends of a rear axle 15, a chassis 20, and an operator's cab 18 from which the tractor can be comfortably operated. The rear wheels 16 of tractor 10 can be driven by a tractor engine 28, which is positioned under a forwardly extending hood 22 located just in front of the operator compartment (cab) 18. A transmission 30 can be fixed to the engine 28 and includes a gearbox that provides a plurality of gear ratios. A differential 32 can be fixed to the rear of the transmission 30 and can transfer power to at least a pair of rear wheels 16 through rear axle 15. Engine 28, transmission 30, and differential 32 collectively comprise chassis 20. In an alternative embodiment, a separate frame or chassis may be provided to which the engine, the transmission, and the differential are coupled, a configuration common in smaller tractors. Still other tractor configurations may drive all wheels on the tractor, use an articulated chassis to steer the tractor, or rely on tracks in lieu of wheels.

Tractor 10 can also include auxiliary systems coupled to engine 28. One such auxiliary system is a hydraulic system 44 which provides a source of pressurized hydraulic fluid for powering various actuators used for driving and/or positioning implements and other detachable equipment. Common hydraulically-powered apparatus can include a three-point hitch (not shown) and one or more electro-hydraulic remote (EHR) valves 52 for controlling the flow of hydraulic fluid to actuators located off of the tractor, such as the implement positioning apparatus 50 shown.

Tractor 10 is shown towing implement 60. Tractor 10 includes drawbar 40 which provides a connection point for hitch 63 on implement 60. Height adjustment and thereby depth of engagement for towed implement 60 can be controlled by an implement positioning apparatus 50 for raising and lowering frame 62 with respect to the nominal surface of the ground. Implement wheels 70 are rotationally coupled to a lower end of mechanical link 66. Link 66, in turn, can be pivotally coupled to the frame 62 at pivot point 67. Link 66 is coupled to frame 62 to pivot clockwise or counterclockwise with respect to the frame 62 about pivot point 67. Link 66 can be pivoted by hydraulic cylinder 58, which is coupled to and between the upper end of link 66 and frame 62. Movement of hydraulic cylinder 58 is controlled by the EHR valve 52 which is connected to hydraulic cylinder 58 by hoses 57. The EHR valve 52 can receive selective input from an operator console 110 or a draft control system 100. When cylinder 58 extends, the cylinder rotates link 66 counterclockwise with respect to the chassis. Due to the rearward angle at which the lower portion of link 66 extends, the counterclockwise rotation causes wheel 70 to rise upward toward frame 62. Since wheel 70 is typically resting on the ground when cylinder 58 is extended and/or retracted, wheel 70 does not actually "rise" or "fall." Instead, frame 62 rises or falls with respect to the wheel, and hence with respect to the ground. Thus, whenever hydraulic cylinder 58 extends, frame 62 lowers downwardly towards the ground and whenever hydraulic cylinder 58 retracts, frame 62 rises upwardly away from the ground. Using the frame 62 as a reference point, however, one can say that the wheels are "raised" or "lowered." In another embodiment, implement positioning apparatus 50 may include one or more wheels 70, links 66 and cylinders 58 for vertically altering the implement position.

Implement 60 can have several ground-engaging implements or tools 64 that are coupled to and extend downward from frame 62. Tools 64 may include, for example, plows, rakes, harrows, or other ground cultivating devices. Still other tool examples include ground injectors, such as those used to apply manure slurry or liquid fertilizers below the ground surface. Whenever frame 62 is raised or lowered with respect to the ground, the depth of penetration of tools 64 is also increased or decreased. Thus, whenever the hydraulic cylinder 58 extends, tools 64 extend further toward or into the ground and whenever the hydraulic cylinder 58 retracts, tools 64 move further from, or out of, the ground. Changes in the depth of penetration of the implement 60 into the ground affect the tractive effort or draft required of the tractor to pull the implement through the ground. Ground injector tools may impose additional requirements in that the ground injector tools may have minimum ground engagement limits during injection activities. The operator, if the implement height is manually controlled, or the draft control system, if the implement height is being automatically controlled, should not lift the implement to a position such that the tools 64 completely disengage the ground whenever injection activities are in process.

Figure 3:
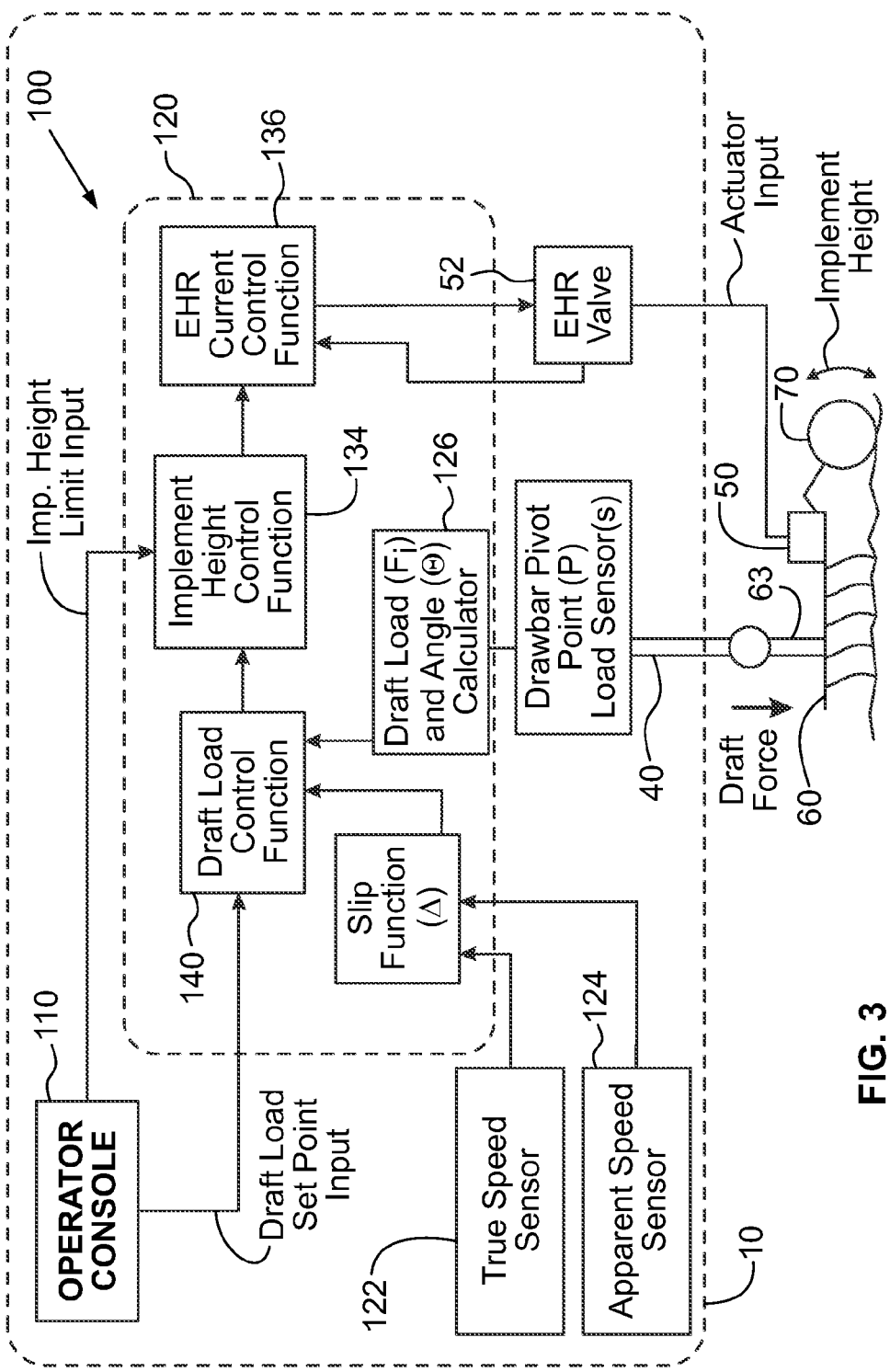
FIG. 3 shows schematically an embodiment of a draft load control system.

FIG. 3 shows an embodiment of a draft load control system. The control functions or controllers shown in FIG. 3 can be provided by software instructions executed by one or more microprocessors within controller 120 of the EDC system 100. The EDC system controller 120 can have three nested functional control loops or processes, including a draft controller 140, an implement height controller 134, and an EHR valve current controller 136. The controller 120 can also include an input measure of the amount of wheel slip occurring, based on signals from speed sensors 122, 124, to improve draft control performance of the EDC system 100. When the EDC system 100 detects a change in the operating draft load on the vehicle, the EDC system 100 can determine whether the change in operating draft load is accompanied by a change in the magnitude of wheel slip and respond accordingly.

For example, a decrease in draft load accompanied by an excessive increase in wheel slip is indicative of a drive wheel or surface spinning instead of an actual reduction of the operating draft load. Under these conditions, the normal response to lower the implement thereby increasing the draft load would only cause increased slip which could lead to stalling the vehicle. Instead, when a decrease in running draft load occurs in conjunction with an increase in wheel slip, the controller 120 momentarily raises the implement, within predefined limits, until the wheel slip returns to within its predefined acceptable limits whereupon the controller 120 can return the implement to a position providing the desired draft load.

Draft controller 140 can receive a desired draft load input from the operator, such as from operator input console 110, a measurement of the amount of wheel slip and a feedback signal from the draft load and angle calculator 126 representing the generally instantaneous magnitude and angle of the draft force (operating draft load). The draft load and angle calculator 126 can determine the draft load and angle for a towed implement based on load measurements obtained from the drawbar pivot point load sensors. The values of the operating and desired draft loads can be compared to generate an error signal, also referred to as a demand signal. The draft load demand signal of the draft controller 140 may be expressed in terms of an increase, decrease, or no change in the operating draft load. The draft load demand signal can be directed or provided to the implement height controller which manages implement height based on the demand to increase, decrease, or maintain the operating draft load. Under steady state conditions, the draft load demand signal may be zero and the EDC system 100 would maintain the implement at the then-present running implement height. In the event the value of the operating draft load differs from the value of the desired draft load, the draft load demand signal can direct the implement height controller 134 to alter implement vertical position and return the error signal to substantially zero. In another exemplary embodiment, the draft controller 140 may provide the draft load demand signal to a different controller that can control other features of the tractor and implement such as tractor speed or tractor gear to maintain draft load. In still another exemplary embodiment, the draft controller 140 may provide a draft load demand signal to a controller to reduce the draft load based solely on the draft angle becoming greater than a predetermined draft angle.

The implement height controller 134 manages the vertical position of the implement by receiving, whether by direct or indirect measurement, a signal representing the generally instantaneous vertical position of the implement (operating height), comparing the position to the draft load demand signal communicated by draft load controller 140, and generating a valve control signal which is communicated to the EHR valve current controller 136. Current controller 136 manages the position of the EHR valve (or valves) 52 by regulating the electrical current supplied to the EHR valve 52. Movement of the EHR valve 52 manages the flow of hydraulic fluid from the hydraulic system 44 on the vehicle to the implement positioning apparatus 50 and thereby adjusts the vertical position of the implement.

Figure 4:
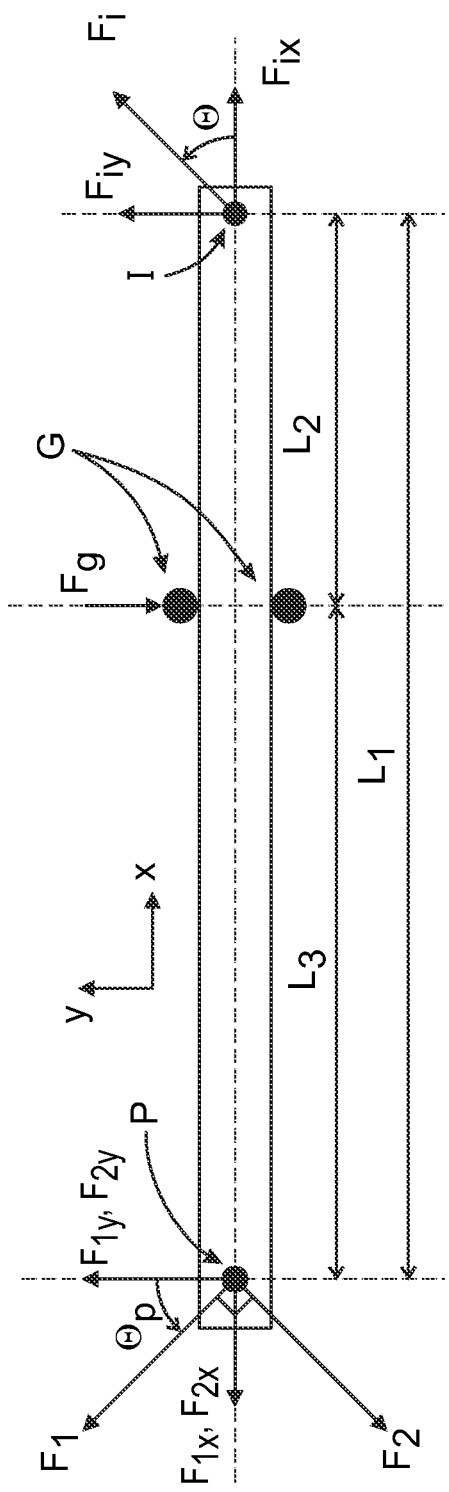
FIG. 4 shows schematically an embodiment of a drawbar for an agricultural tractor with corresponding forces applied to the drawbar by a towed implement.

FIG. 4 shows schematically one embodiment of a drawbar for an agricultural tractor showing the draft force magnitude $F_i$ and angle θ (from the longitudinal axis) applied by the towed implement at the implement attachment point I and the load forces $F_1$, $F_2$, measured by the drawbar pivot point sensors at the drawbar pivot point P. The drawbar shown in FIG. 4 includes guide pins G that can enable an operator to adjust the position of the drawbar about the pivot point P.

In one exemplary embodiment, the load forces $F_1$, $F_2$, can be measured by a load sensing pin with two orthogonal measurement axes used at the drawbar pivot point P. However, any suitable sensors or techniques for measuring the load forces $F_1$, $F_2$, can be used at the drawbar pivot point P. For example, if the drawbar-tractor interface was a hydraulic coupler, a sensor(s) could be used to measure the fluid pressure(s) that correspond to the load forces.

Figure 5:
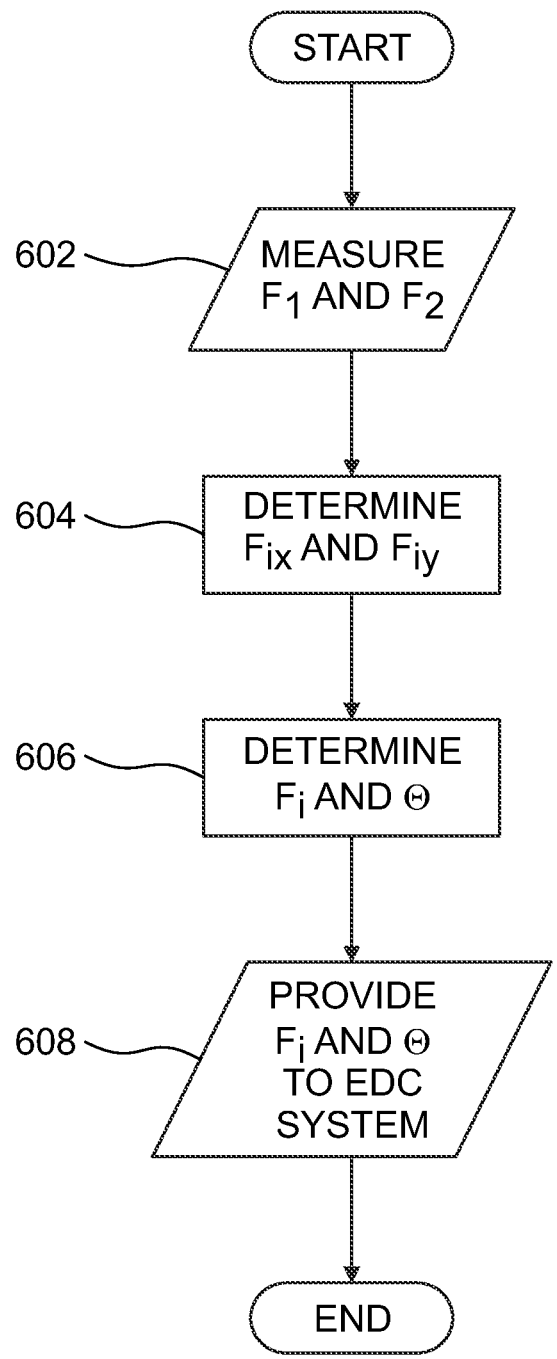
FIG. 5 shows a flow chart of an embodiment of a process for calculating the draft force magnitude and direction.

FIG. 5 shows an embodiment of a process for determining the draft force magnitude $F_i$ and direction or angle θ (from the longitudinal axis). The process begins by measuring the orthogonal forces $F_1$, $F_2$ at the drawbar pivot point P (step 602). Next, $F_{ix}$ and $F_{iy}$ are calculated using the measured forces $F_1$, $F_2$ (step 604). Using $F_{ix}$ and $F_{iy}$, $F_i$ and θ can then be calculated (step 606). The calculated $F_i$ and θ are then provided to the EDC system for further processing by the EDC system (step 608).

With regard to the drawbar configuration of FIG. 4, the draft force magnitude $F_i$ and direction or angle θ (from the longitudinal axis) can be calculated as follows using the process of FIG. 5. In an equilibrium state, the total of the x (longitudinal) and y (lateral) forces equal zero and the total of the moments at the guide pins G and the implement attachment point I equal zero as defined by equations (1)-(4).

$$\Sigma F_X = 0 = F_i \cos\theta - F_1 \sin\theta_p - F_2 \cos\theta_p \quad (1)$$

$$\Sigma F_y = 0 = F_i \sin\theta + F_1 \cos\theta_p - F_2 \sin\theta_p - F_g \quad (2)$$

$$\Sigma M_I = 0 = F_g \cdot L_3 - F_1 \cos\theta_p \cdot L_1 + F_2 \sin\theta_p \cdot L_1 \quad (3)$$

$$\Sigma M_G = 0 = F_i \sin\theta \cdot L_3 - F_1 \cos\theta_p \cdot L_2 + F_2 \sin\theta_p \cdot L_2 \quad (4)$$

The x and y force components of $F_i$, $F_1$ and $F_2$ are defined by equations (5)-(10).

$$F_{ix} = F_i \cos\theta \quad (5)$$

$$F_{iy} = F_i \sin\theta \quad (6)$$

$$F_{1x} = F_1 \sin\theta_p \quad (7)$$

$$F_{1y} = F_1 \cos\theta_p \quad (8)$$

$$F_{2x} = F_2 \cos\theta_p \quad (9)$$

$$F_{2y} = F_2 \sin\theta_p \quad (10)$$

Using equation (3), $F_g$ can be calculated using equation (11).

$$F_g = F_1 \cos\theta_p \cdot \left(\frac{L_1}{L_3}\right) - F_2 \sin\theta_p \cdot \left(\frac{L_1}{L_3}\right) \quad (11)$$

Using equations (4) and (6), $F_{iy}$ can be calculated using equation (12).

$$F_{iy} = F_1 \sin\theta = F_1 \cos\theta_p \cdot \left(\frac{L_2}{L_3}\right) - F_2 \sin\theta_p \cdot \left(\frac{L_2}{L_3}\right) \quad (12)$$

Using equations (1) and (5), $F_{ix}$ can be calculated using equation (13).

$$F_{ix} = F_i \cos\theta = F_1 \sin\theta_p + F_2 \cos\theta_p \quad (13)$$

After $F_{ix}$ and $F_{iy}$ are determined using equations (12) and (13), $F_i$ and $\theta$ can be calculated using equations (14) and (15).

$$F_i = \sqrt{F_{ix}^2 + F_{iy}^2} \quad (14)$$

$$\theta = \tan^{-1}\left(\frac{F_{iy}}{F_{ix}}\right) \quad (15)$$

In one exemplary embodiment, the process for calculating lateral and longitudinal forces can be performed even if there are no lateral forces present because the towed implement is directly behind the tractor, i.e., the tractor and implement share the "common axis." In such a situation, the lateral force would be calculated to be zero and the EDC system can operate using only the longitudinal force.

In another exemplary embodiment, the process of FIG. 5 can be applied to a "fixed" drawbar, i.e., a drawbar that does not incorporate guide pins or has guide pins, supports or other structures that are not positionable or relocatable. In still another exemplary embodiment, the guide pins or supports can be positioned apart or separated by a distance that is greater than the width of the drawbar to permit or enable some free movement of the drawbar. The resultant force at the drawbar pivot point can be equal and opposite to the force of the implement while the drawbar is rotating or moving freely between the guide pins.

It should be understood that the application is not limited to the details or methodology set forth in the following description or illustrated in the figures. It should also be understood that the phraseology and terminology employed herein is for the purpose of description only and should not be regarded as limiting.

The present application contemplates methods, systems and program products on any machine-readable media for accomplishing its operations. The embodiments of the present application may be implemented using existing computer processors, or by a special purpose computer processor for an appropriate system, or by a hardwired system.

Embodiments within the scope of the present application include program products including machine-readable media for carrying or having machine-executable instructions or data structures stored thereon. Machine-readable media can be any available non-transitory media that can be accessed by a general purpose or special purpose computer or other machine with a processor. By way of example, machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Combinations of the above are also included within the scope of machine-readable media. Machine-executable instructions comprise, for example, instructions and data which cause a general purpose computer, special purpose computer, or special purpose processing machines to perform a certain function or group of functions.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Likewise, software implementations could be accomplished with standard programming techniques with rule based logic and other logic to accomplish the various connection steps, processing steps, comparison steps and decision steps.

In the further consideration of the drawings of this application and the discussion of such drawings and the elements shown therein, it should also be understood and appreciated that, for purposes of clarity in various of such drawings, pluralities of generally like elements positioned near to one another or extending along some distance may sometimes, if not often, be depicted as one or more representative elements with extended phantom lines indicating the general extent of such like elements. In such instances, the various elements so represented may generally be considered to be generally like the representative element depicted and generally operable in a like manner and for a like purpose as the representative element depicted.

Many of the fastening or connection processes and components utilized in the application are widely known and used, and their exact nature or type is not necessary for an understanding of the application by a person skilled in the art. Also, any reference herein to the terms "left" or "right" is used as a matter of mere convenience, and is determined by standing at the rear of the machine facing in its normal direction of travel. Furthermore, the various components shown or described herein for any specific embodiment in the application can be varied or altered as anticipated by the application and the practice of a specific embodiment of any element may already by widely known or used by persons skilled in the art.

It will be understood that changes in the details, materials, steps and arrangements of parts which have been described and illustrated to explain the nature of the application will occur to and may be made by those skilled in the art upon a reading of this disclosure within the principles and scope of the application. The foregoing description illustrates an exemplary embodiment of the invention; however, concepts, as based upon the description, may be employed in other embodiments without departing from the scope of the application.

While the application has been described with reference to an exemplary embodiment, it will be understood by those skilled in the art that various changes may be made and equivalents may be substituted for elements thereof without departing from the scope of the application. In addition, many modifications may be made to adapt a particular situation or material to the teachings of the application without departing from the essential scope thereof. Therefore, it is intended that the application not be limited to the particular embodiment disclosed as the best mode contemplated for carrying out this application, but that the invention will include all embodiments falling within the scope of the appended claims.

What is claimed is:

1. A method comprising:
   measuring a first force applied in a first direction and a second force applied in a second direction on a drawbar of a tractor at a pivot point of connection between the tractor and a towed implement, the first force and the second force on the drawbar being generated by the towed implement;
   calculating a lateral component of a draft force applied to the tractor by the towed implement using the first measured force and the second measured force and a known orientation of at least one of the forces;
   calculating a longitudinal component of the draft force applied to the tractor by the towed implement using the first measured force and the second measured force and the known orientation of at least one of the first and second forces;
   calculating a magnitude of the draft force applied to the tractor by the towed implement using the calculated longitudinal component of the draft force and the calculated lateral component of the draft force;
   calculating a direction of the draft force applied to the tractor by the towed implement using the calculated longitudinal component and the calculated lateral component, the direction of the draft force being calculated relative to a center axis of the drawbar;
   providing the calculated magnitude of the draft force and the calculated direction of the draft force to an electronic draft control system; and
   setting an operating configuration of at least one of the tractor or towed implement with the electronic draft control system in response to at least one of the calculated magnitude of the draft force and the calculated direction of the draft force.

2. The method of claim 1 wherein the first measured force is orthogonal to the second measured force.

3. The method of claim 1 wherein a position of the drawbar is determined by a placement of guide pins and the first controller calculates a lateral force present at the guide pins with the microprocessor executing the computer program.

4. The method of claim 1 wherein measuring a first force and a second force on a drawbar comprises measuring the first force and the second force at the pivot point of the drawbar directly using first and second load sensors mounted in fixed positions.

5. The method of claim 1 wherein the forces are measured using a load pin at the drawbar pivot point of connection with the implement configured to detect forces along at least two axes.

6. The method of claim 1 wherein setting an operating configuration of at least one of the tractor or towed implement comprises at least one of adjusting a height of the towed implement or adjusting a tractor speed.

7. The method of claim 1 wherein calculating a longitudinal component of the draft force comprises adding the first force multiplied by a first adjustment factor to the second force multiplied by a second adjustment factor.

8. The method of claim 1 wherein calculating a lateral component of a draft force comprises adding the first force multiplied by a first adjustment factor to the second force multiplied by a second adjustment factor.

9. The method of claim 8 wherein the second adjustment factor is a negative number.

10. The method of claim 8 wherein the first adjustment factor and the second adjustment factor each incorporates a distance ratio related to a position of guide pins used with the drawbar.

11. The method of claim 1 wherein calculating a direction of the draft force comprises calculating an angle from the center axis of the drawbar at which the draft force is applied within a generally horizontal plane.

12. An electronic draft control system for a tractor having a drawbar comprising:
    a first sensor configured to measure directly a first force applied in a first direction on a drawbar of the tractor generated by a towed implement;
    a second sensor configured to measure directly a second force applied in a second direction on the drawbar of the tractor generated by the towed implement;
    wherein the first and second sensors are mounted at fixed positions at a pivot point of connection between the tractor and the towed implement; at least one controller comprising a microprocessor configured to execute a computer program to calculate the magnitude and direction of the draft force applied to the tractor using the first measured force and the second measured force and the known orientation of at least one of the first and second forces; and
    the at least one controller programmed to generate a control signal to establish an operating configuration of at least one of the tractor and towed implement in response to at least one of the calculated magnitude or direction of the draft force.

13. The electronic draft control system of claim 12 wherein the first measured force is orthogonal to the second measured force.

14. The electronic draft control system of claim 13 wherein the first sensor and the second sensor are incorporated into a load sensing pin wherein the pin is configured to detect forces along at least two axes.

15. The electronic draft control system of claim 14 wherein the load sensing pin is positioned at the pivot point of the drawbar and the implement.

16. The electronic draft control system of claim 15 wherein a position of the drawbar is determined by a placement of guide pins and the at least one controller is programmed to calculate a lateral force present at the guide pins.

17. The electronic draft control system of claim 12 wherein the calculation of the magnitude and direction of the draft force by the at least one controller is determined as a function of the measured first and second forces within a generally horizontal plane.

18. The electronic draft control system of claim 12 further comprising the at least one controller program to generate a control signal to adjust a height of the towed implement or adjust a speed of the tractor in response to the determined operating configuration.

19. The electronic draft control system of claim 12 wherein the calculation of the magnitude and direction of the draft force by the at least one controller includes the calculation of a lateral force component and a longitudinal force component.

20. The electronic draft control system of claim 12 wherein the direction of the draft force is provided as an angle from a center axis of the drawbar.

* * * * *